United States Patent [19]
Blake et al.

[11] 3,821,435
[45] June 28, 1974

[54] DEHYDRATED VEGETABLES

[75] Inventors: Anthony Blake, Ravensden; Sidney Pendlington, Bromham, both of England

[73] Assignee: Lever Brothers Company, New York, N.Y.

[22] Filed: Feb. 22, 1971

[21] Appl. No.: 117,816

Related U.S. Application Data

[63] Continuation-in-part of Ser. No. 766,319, Oct. 9, 1968, abandoned.

[30] Foreign Application Priority Data

Oct. 17, 1967 Great Britain.................... 47235/67

[52] U.S. Cl................. 426/199, 426/203, 426/205, 426/271, 426/377, 426/473
[51] Int. Cl............................................. A23p 1/40
[58] Field of Search............. 99/103, 104, 124, 204

[56] References Cited
UNITED STATES PATENTS

| | | | |
|---|---|---|---|
| 1,598,883 | 9/1926 | Sackett | 99/104 |
| 1,907,801 | 5/1933 | Norris | 99/124 |
| 2,278,466 | 4/1942 | Musher | 99/1 |
| 2,297,502 | 9/1942 | Rudolph | 99/124 X |
| 2,577,704 | 12/1951 | Flosdorf | 99/204 |
| 2,865,754 | 12/1958 | Doroba | 99/1 |
| 3,108,884 | 10/1963 | Nielsen | 99/204 |
| 3,453,118 | 7/1969 | Tobin | 99/104 |
| 3,563,768 | 2/1971 | Melnick | 99/124 |

*Primary Examiner*—Robert Halper
*Attorney, Agent, or Firm*—Richard A. Gaither; Arnold Grant; Melvin H. Kurtz

[57] ABSTRACT

The reconstitution time of pieces of dried vegetable in a dry vegetable soup is reduced by reconstituting the dry soup in the presence of an alkali metal citrate, which complexes calcium and magnesium ions.

9 Claims, No Drawings

DEHYDRATED VEGETABLES

BACKGROUND OF THE INVENTION

This application is a continuation-in-part of U.S. application Ser. No. 766,319 now abandoned, filed Oct. 9, 1968.

1. Field of the Invention

The present invention relates to dry vegetable soup mixes comprising dried vegetable pieces, and an alkali metal salt of citric acid, preferably trisodium citrate dihydrate, to shorten rehydration time when the dried vegetable pieces are reconstituted with water. Encompassed within the invention is a method for preparing a dry vegetable soup mix containing a proportion of an alkali metal citrate sufficient to shorten reconstitution time.

2. The Prior Art

Representative of the art pertaining to the use of trisodium citrate with vegetables is U.S. Pat. No. 2,297,502 to Rudolph. This patent teaches that citrates accelerate the disintegration of peas in the preparation of ground pea meal, during a step of cooking peas in water. By this treatment the peas cannot be reconstituted.

U.S. Pat. No. 3,116,151 to Giddey, and French Pat. No. 1,087,717 to Gillet relate to the use of citric acid and sodium citrate respectively in grated food products.

U.S. Pat. No. 1,907,801 to Harris discloses the use of citric acid during the hydration of vegetables with water.

U.S. Pat. No. 3,295,995 to Bright, et al discloses the use of citric acid in a sulfiting solution in which potato pieces are treated prior to dehydration.

SUMMARY OF THE INVENTION

Vegetables are dried primarily to preserve them and to ease their storage and handling. To reconstitute them for eating, the dried vegetables are at least partially rehydrated. The time taken to rehydrate may be considerable, even if rehydration is in boiling water, and this delay may be inconvenient to the eventual user. For example, a dry soup mix containing pieces of dried vegetable may have to be simmered for 10 to 30 minutes after heating to boiling, this simmering being solely to reconstitute the dried vegetable components of the soup mix.

It has now been found that the reconstitution time of dried vegetables in a dry vegetable soup mix is reduced if the dry vegetable soup mix is reconstituted in the presence of an alkali metal citrate in an amount at least sufficient to chelate any calcium or magnesium ions in the reconstituted soup. The source of the calcium and magnesium ions may be the vegetables or may be the water in which the dry vegetables are reconstituted.

It is an object of the present invention to provide pieces of dehydrated vegetables, having an intact cell structure, in contact with minor proportions of alkali metal citrate dihydrate to accelerate the reconstitution of said pieces of dehydrated vegetables.

It is another object of the invention to provide a dry vegetable soup mix capable of reconstitution with water, comprising dried vegetable pieces having a substantially intact cell structure and an alkali metal citrate dihydrate in an amount at least sufficient to shorten the reconstitution time of the mix.

It is a further object of the invention to provide a method for preparing a dry vegetable soup mix capable of rapid reconstitution with water, comprising preparing pieces of vegetables leaving their cell structure substantially intact, dehydrating the vegetable pieces, and adding thereto an alkali metal citrate dihydrate.

Accordingly the present invention provides a dry vegetable soup mix comprising a mixture of (1) dried vegetable pieces having a substantially intact cell structure and capable of reconstitution with water, and (2) an alkali metal citrate dihydrate.

More specifically, the invention embodies a dry vegetable soup mix comprising dried vegetable pieces selected from the group consisting of carrots, turnips, swedes, parsnips, green beans, onions, cabbage, leek, tomato, celery, celleriac, peppers, peas, and mixtures thereof, the cellular structure of said vegetable pieces being substantially intact, said dried vegetable pieces having absorbed therewithin an alkali metal salt of citric acid, the proportion of said alkali metal salt of citric acid comprising at least about 1 part by weight for every 20 parts by weight of said dried vegetable pieces.

In a preferred embodiment, the invention is applicable to a mixture of a number of vegetable types.

There is also provided by the invention a method for preparing a rapidly reconstituting dry vegetable mix comprising (1) preparing pieces of vegetables of a size and in such a manner that their cell structure remains substantially intact, (2) drying the pieces of vegetables, and (3) adding to the dried pieces of vegetables an alkali metal citrate dihydrate. The vegetable pieces may be selected from the group consisting of carrots, turnips, swedes, parsnips, green beans, onions, cabbage, leek, tomato, celery, celleriac, peppers, peas, and mixtures thereof.

A method within the invention for preparing a dry vegetable soup mix may be more specifically described as comprising (1) preparing pieces of vegetables selected from the group consisting of carrots, turnips, swedes, parsnips, green beans, onions, cabbage, leek, tomato, celery, celleriac, peppers, peas, and mixtures thereof, (2) contacting said vegetable pieces before drying with a solution of an alkali metal salt of citric acid, (3) draining said vegetable pieces thereby contacted to provide vegetable pieces impregnated with said alkali metal salt of citric acid, and (4) drying said impregnated vegetable pieces to provide a dry soup mix ingredient in which the cellular structure of said vegetable pieces is substantially intact, the proportion of alkali metal salt of citric acid in the dried soup mix comprising at least about 1 part by weight for every 20 parts by weight of said dried vegetable pieces.

The invention is especially applicable to vegetables containing a relatively high quantity of naturally-occurring pectin, and having a large number of small cells, for example carrots and also turnips, swedes, parsnips, green beans, onions, cabbage (stalk), leek, tomato, celery, celleriac, peppers and peas. The invention is especially applicable to intact pieces of these vegetables, and to pieces cut only to such a size and in such a manner that the cell structure of the vegetable remains substantially undamaged.

The size of the vegetable pieces is not critical to the invention, provided that the size is such that the pieces are reconstitutable in a reasonably short time. Thus the invention has no utility for dried vegetables in powder form or for dried vegetables which have been distorted under pressure or otherwise to the extent that the cell structure has received substantial damage.

By way of illustration, in the practice of the invention, vegetables may be cut, diced, or sliced, then dried by using conventional equipment designed for this purpose to provide intact pieces having a cross-sectional area of less than about 1 sq. in., and preferably less than about 1/2 sq. in. For instance, the vegetables may be cut to provide dice having dimensions of about 1 inch by 1/2 inch down to as small as about 1/8 inch by 1/8 inch in cross-sectional dimensions, or even smaller provided that the cellular structure of the dice remains substantially intact. In the smaller, irregularly shaped pieces, the pieces will in general not be smaller than can be described as having a measurement of at least about 1/8 inch along a major linear cross-sectional dimension.

The vegetable pieces may be dried or dehydrated by any conventional method which does no substantial damage to the cell structure. Air-drying is preferred.

The proportion of citrate employed may vary over a wide range, but of course a quantity sufficient to accelerate the reconstitution of the dry vegetable mix will be used, and normally large excesses will not be employed. The quantity of citrate incorporated in the dried soup mix according to the invention is at least 1 gram calculated as sodium citrate dihydrate for every 20 grams of dried vegetable pieces in the dried soup mix. At levels substantially less than this, the citrate has little effect on the reconstitution time of the dried vegetable soup mix. Preferably, the proportion of citrate in the dry soup mix is at least 1 gram of citrate, expressed as trisodium citrate dihydrate, for every 10 grams of dried vegetable pieces in the dry soup mix. As high as about 5 grams of citrate, expressed as trisodium citrate dihydrate, for 10 grams of dried vegetable pieces, may be used with good effect.

The proportion of citrate is adequate at the level of one molar proportion of citrate per molar proportion of calcium and/or magnesium ion in the reconstituted soup.

A suitable form of citrate is powdered crystalline trisodium citrate dihydrate. The citrate may be incorporated in the dried vegetable component of the dry soup mix, for example by dipping the vegetable in a citrate solution and drying or by dusting the vegetable with a dry citrate, or it may be incorporated in the dry soup mix, for example by mixing dry citrate into the mix.

Surprisingly, other chelating agents do not give a comparable reduction in the reconstitution time of dry vegetable soup mixes. Thus, using air-dried carrot dice, we found reconstitution times in boiling water as follows:

| | |
|---|---|
| No chelater | 15 minutes reconstitution time |
| Citrate | 2–3 minutes reconstitution time |
| E.D.T.A. | 6–7 minutes reconstitution time |
| Succinate | 12–13 minutes reconstitution time |
| Aspartate | 15 minutes reconstitution time |
| Lactate | 15 minutes reconstitution time |
| Malonate | 25 minutes reconstitution time |
| Maleate | 20 minutes reconstitution time | all the chelaters being used at equimolar concentrations of their calcium complexing ion or compound.

Dry vegetable soups usually contain edible starches, protein, salt, fat, and flavoring substances in addition to dried vegetable pieces. These varied ingredients, contrary to expectation, have no significant effect on the reconstitution time of the dried vegetable pieces.

The dry vegetable soup mix in accordance with the invention may contain from about 20 percent to about 70 percent by weight of dried vegetable pieces, and preferably the proportion is from about 30 percent to about 60 percent.

The following examples are illustrative, but not limitative, of the invention.

EXAMPLE 1

Two dried vegetable soup mixes are prepared containing 70 percent of a mixture of air-dried pieces of carrot, celery, bell peppers and green beans, and respectively 4.1 percent and 6.7 percent crystalline trisodium citrate dihydrate, the balance consisting of dry noodles, protein and fat. This represents the use of one gram of trisodium citrate dihydrate with 17 grams and with 10 grams respectively of dry vegetable pieces. These dry vegetable soup mixes are added to water and reconstituted by boiling gently for 7½ and 5 minutes respectively. The vegetables in the two soups are judged by a group of trained testers to be at least as tender as those in a control soup containing no added citrate which is boiled for 15 minutes. Further, the appearance of the soup and noodles is unchanged by the citrate, even at the higher level of citrate used.

EXAMPLE 2

A dry vegetable soup mix is prepared composed of 43 percent of a mixture of dried vegetable pieces consisting of carrot, cabbage, parsnips, peas, green beans, onions, swede, tomato and turnip, 50.3 percent other ingredients including edible starch, protein, salt, fat, flavorings and 6.7 trisodium citrate dihydrate. This represents one gram trisodium citrate dihydrate with 6.4 grams dried vegetable pieces. The dry vegetable soup mix is added to water and is found to be fully cooked, i.e., fully tenderized and of a desirable eating quality, after 5 minutes' cooling at 100° C, compared with 15 minutes' cooking required for a control sample containing no added citrate.

EXAMPLE 3

A dry vegetable soup mix is prepared composed of 47.5 percent of a mixture of dried vegetable pieces consisting of carrot, cabbage, green peas, yellow peas, parsnip, onion, turnip and tomato, 47.5 percent other ingredients including edible starch, noodles, salt, fat, protein, flavorings and 5 percent trisodium citrate dihydrate. This represents one gram trisodium citrate dihydrate for each 9.5 grams dried vegetable pieces. The dry vegetable soup mix is added to water and is found to be fully cooked, i.e., fully tenderized and of a desirable eating quality, after 5 minutes' cooking at 100° C, compared with 15 minutes' cooking required for a control sample containing no added citrate.

EXAMPLE 4

A dry vegetable soup mix is prepared composed of 28.5 percent of a mixture of dried vegetable pieces consisting of carrot, leek, onion, peas, swede and potato, 66.5 percent other ingredients including edible fat, edible starch, barley, salt, meat, flavorings and 5 percent trisodium citrate dihydrate. This represents using one gram trisodium citrate dihydrate with 5.7 grams dried vegetable pieces. The dry vegetable soup mix is added to water, and is found to be fully cooked, i.e., fully tenderized and of a desirable eating quality, after 5 minutes' cooking at 100° C, compared with 20 minutes' cooking required for a control sample containing no added citrate.

EXAMPLE 5

A dry vegetable soup mix is prepared consisting essentially of the following formulation:

| Dehydrated Vegetable Pieces | Percent By Weight |
|---|---|
| Onions | 9.5 |
| Peas | 7.5 |
| Green Beans | 6.5 |
| Carrot | 6.0 |
| Swede | 4.5 |
| Turnip | 3.0 |
| Parsnip | 3.0 |
| Cabbage | 1.5 |
| Other Ingredients | |
| trisodium citrate dihydrate | 6.7 |
| starch | 18.8 |
| protein hydrolysate | 15.5 |
| salt | 6.0 |
| spray dried fat | 4.5 |
| flavoring | 2.5 |
| Tomato (powder) | 4.5 |

This represents the use of one gram of trisodium citrate dihydrate with 6.9 grams of dried vegetable pieces.

The dry vegetable soup mix is added to water and is found to be fully cooked after 5 minutes' cooking at 100° C, compared with 15 minutes' cooking required for a control sample containing no added citrate.

Having thus described the invention, many modifications within the spirit thereof will be evident to those skilled in the art, and the scope of the invention is to be limited only by the appended claims.

What is claimed is:

1. A dry vegetable soup mix capable of being rapidly reconstituted in water comprising:
   i. 20 – 70 percent dry vegetable pieces having a substantially intact cell structure;
   ii. 80 – 30 percent other dry soup ingredients comprising edible starch, protein, salt, fat and flavoring substances, said percentages being by weight of the total of said dried vegetable pieces and said other dry soup ingredients, and
   iii. an alkaline metal citrate in an amount equivalent to at least about 1 gram of trisodium citrate dihydrate for each 20 grams of said dried vegetable pieces.

2. A dry vegetable soup mix in accordance with claim 1 wherein said alkali metal salt of citric acid is trisodium citrate dihydrate.

3. A dry vegetable soup mix in accordance with claim 1 wherein said dried vegetable pieces are of a size at least one-eighth inch along a major linear cross-sectional dimension.

4. A dry vegetable soup mix in accordance with claim 1, wherein said dried vegetable pieces comprise a mixture of carrot, celery, bell peppers and green beans.

5. A dry vegetable soup mix in accordance with claim 1 comprising:

| | Percent By Weight |
|---|---|
| i) dehydrated vegetable pieces consisting essentially of: | |
| onions | 9.5 |
| peas | 7.5 |
| green beans | 6.5 |
| carrot | 6.0 |
| swede | 4.5 |
| turnip | 3.0 |
| parsnip | 3.0 |
| cabbage | 1.5, and |
| ii) other ingredients consisting essentially of: | |
| trisodium citrate dihydrate | 6.7 |
| starch | 18.8 |
| protein hydrolysate | 15.5 |
| salt | 6.0 |
| spray dried fat | 4.5 |
| flavoring | 2.5 |
| tomato (powder) | 4.5 |

6. A dry vegetable soup mix in accordance with claim 3 in which the dry vegetable pieces are selected from the group consisting of carrots, turnips, swedes, parsnips, green beans, onions, cabbage, leek, tomato, celery, celleriac, peppers, peas and mixtures thereof, the cellular structure of said vegetable pieces being substantially intact.

7. A method for preparing a dry vegetable soup mix comprising:
   i. drying pieces of vegetables selected from the group consisting of carrots, turnips, swedes, parsnips, green beans, onions, cabbage, leak, tomato, celery, celleriac, peppers, peas and mixtures thereof, the cellular structure of said vegetable pieces being substantially intact and,
   ii. adding to said dried vegetable pieces an alkali metal citrate in an amount equivalent to at least about 1 part of trisodium citrate dihydrate for each 20 parts by weight of said dried vegetable pieces and other dry soup ingredients selected from the group consisting of starches, proteins, salt, fats, flavorings, substances and mixtures thereof thereby providing a dry vegetable soup mix capable of a rapid reconstitution in water when prepared for consumption.

8. A method for preparing a dry vegetable soup mix in accordance with claim 7 comprising blending together:
   i. 20–70 percent dried vegetable pieces having a substantially intact cell structure,
   ii. 80–30 percent other dry soup ingredients comprising edible starch, protein, fat, salt, and flavoring substances, and
   iii. an alkali metal citrate in an amount equivalent to at least 1 gram of trisodium citrate dihydrate for each 20 grams of said dried vegetable pieces,
said dry vegetable soup being capable of reconstitution upon cooking with water to a fully tenderized product having a desirable eating quality in less time than required for a like mixture without the presence of citrate ion.

9. A method for preparing a dry vegetable soup mix in accordance with claim 7 wherein said alkali metal citrate is trisodium citrate dihydrate.

* * * * *